United States Patent [19]
Eaton

[11] 3,922,833
[45] Dec. 2, 1975

[54] FASTENER
[75] Inventor: Robert F. Eaton, Riverside, Ill.
[73] Assignee: Service Master Industries Inc., Downers Grove, Ill.
[22] Filed: Aug. 5, 1974
[21] Appl. No.: 494,621

[52] U.S. Cl. .............................. 52/753 C; 16/172
[51] Int. Cl.² ...................... F16B 5/07; F16B 2/20
[58] Field of Search ...... 52/758 D, 588, 584, 753 R, 52/753 C, 753 D, 753 J, 753 W, 754; 16/149, 171, 172, DIG. 13

[56] References Cited
UNITED STATES PATENTS

| | | | |
|---|---|---|---|
| 2,521,279 | 9/1950 | Becker | 52/758 D X |
| 2,828,842 | 4/1958 | Plumley et al. | 52/758 D X |
| 2,845,150 | 7/1958 | McBerty | 52/758 D X |
| 3,119,473 | 1/1964 | Mitchell | 52/758 D |
| 3,191,726 | 6/1965 | Pavlecka | 52/758 D X |
| 3,462,906 | 8/1969 | Schroyer | 52/588 X |
| 3,557,511 | 1/1971 | Curran | 52/584 X |

FOREIGN PATENTS OR APPLICATIONS 812,130  12/1951  Germany .......................... 52/758 D Primary Examiner—Werner H. Schroeder
Assistant Examiner—Wayne L. Shedd
Attorney, Agent, or Firm—Molinare, Allegretti, Newitt & Witcoff

[57] ABSTRACT

A unitary fastener. The fastener includes a strip section and a series of partially circular, flexible fastening sections adapted to receive a rod-shaped structure.

4 Claims, 4 Drawing Figures

FASTENER

BACKGROUND OF THE INVENTION

The present invention relates generally to a fastener and, more particularly, to a fastener for securing a panel or plate to a rod-shaped structure.

In many types of industrial cleaning machines, the housing includes a series of panels which fasten to the tubular framework of the cleaning machine. The top, bottom, sides, front and rear of the cleaning machine are covered in this fashion.

It is desirable that the top, front and rear panels be rigidly or fixedly secured to the framework structure to provide a permanent housing, while the bottom and side panels be detachably or hingedly secured to facilitate maintenance service and work. However, a single type of fastener is also desirable to minimize production costs.

SUMMARY OF THE INVENTION

In a principal aspect, the present invention comprises a unitary member including a strip section and a series of flexible, resilient fastening sections integral with and spaced along the strip section. The strip section is secured to a panel.

The fastening sections have a partially circular cross-sectional shape of more than 180°. Each fastening section defines a pair of arc-ending longitudinal edges, a gap between the longitudinal edges, and a substantially round inner periphery, adapted to receive a rod-shaped structure.

The shape and flexibility of the fastening sections cooperatively permit the rod-shaped structure to pass through the gap by flexion of the longitudinal edges to increase the gap span. As such, the panel is detachably secured to the rod-shaped structure.

In addition, the fastening sections, strip section, and rod-shaped structure cooperatively define a hinge. Thus, the panel can be pivotally rotated about the rod-shaped structure.

The panel and framework structure are rigidly connected by permanently and fixedly securing the fastening sections fo the framework structure. This is accomplished by an adhesive or a series of pins, which pass through the fastening sections and tubular structure.

It is thus an object of the present invention to provide a fastener for detachably and hingedly or, alternatively, rigidly and fixedly securing a panel to a rod-shaped structure.

It is a further object of the present invention to provide a fastener for hingedly or fixedly securing a panel to a rod-shaped structure which may be easily and inexpensively manufactured.

These and other objects and advantages of the present invention will become apparent in the following detailed description.

BRIEF DESCRIPTION OF THE DRAWING

The present invention will be described, in detail, with reference to the drawing wherein.

DETAILED DESCRIPTION OF THE PREFERRED EMBODIMENT

Figure 1:
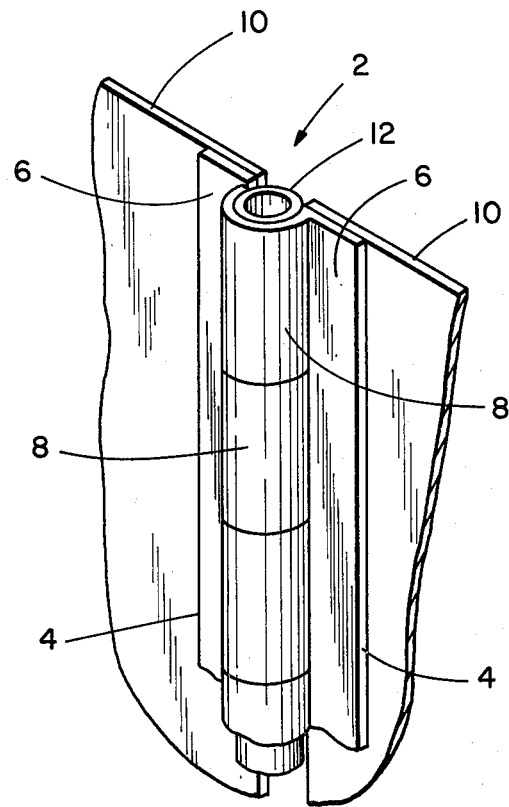
FIG. 1 is a partial perspective view of a preferred embodiment of the present invention.
Figure 2:
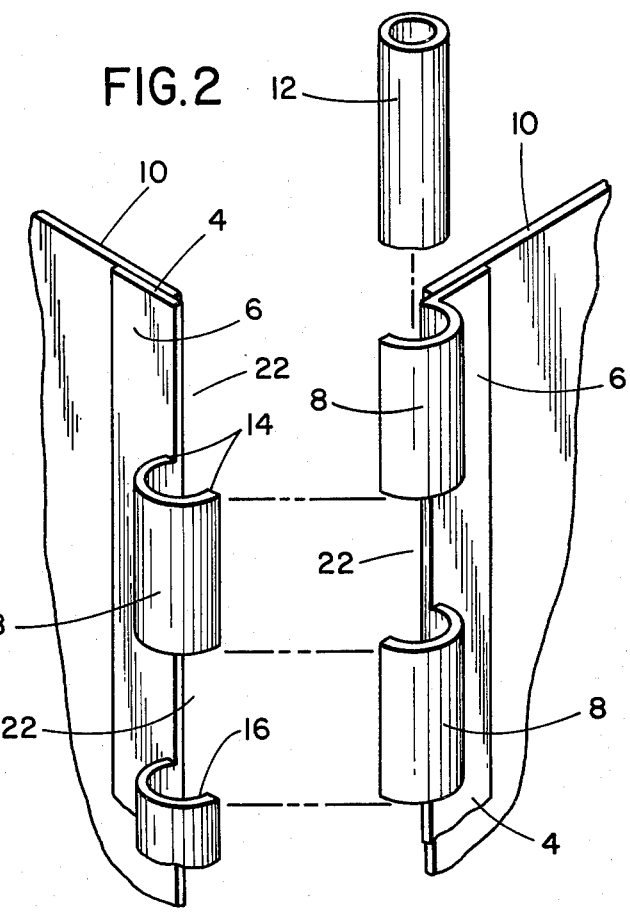
FIG. 2 is a partial exploded view of the preferred embodiment shown in FIG. 1.
Figure 3:
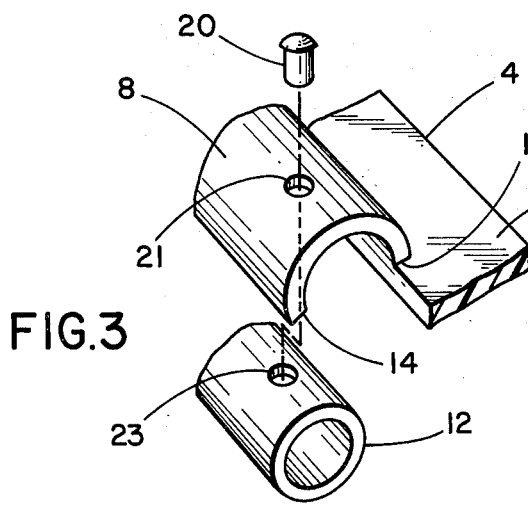
FIG. 3 is a partial perspective view of a fastener for use in the preferred embodiment shown in FIG. 1.

Referring to FIGS. 1–3, a preferred embodiment of the present invention is shown and generally designated as a fastening device 2. The device 2 includes a pair of fasteners 4. The fastener 4 includes a strip section 6 and a series of fastening sections 8. The fastener 4 detachably and hingedly secures a panel 10 to a rod-shaped structure 12 having a round cross-sectional periphery, which acts as a hinge pin. The panel 10 is secured to the strip section 6 of the fastener 4 by an adhesive, cement or solvent.

As best shown in FIGS. 2 and 3, the fastening section 8 is, in cross-section, partially circular, and the extent of circularity is more than 180°. As such, the fastening section 8 defines a pair of arc-ending longitudinal edges 14 and round, inner periphery, generally designated 16. The fastening sections 8 are unitary with and spaced along the strip section 6.

The fastening section 8 also defines a transverse gap 18 between the longitudinal edges 14. The fastener 4 is manufactured such that the transverse gap 18 is less than the outside diameter of the rod-shaped structure 12. The inner diameter $d$ of the fastening sections 8, i.e., the diameter of the inner periphery 16, and the outside diameter of the rod-shaped structure 12 are, however, substantially equal, such that the fastening section 8 is adapted to engagingly receive the rod-shaped structure 12, as described below.

As indicated, the fastening sections 8 of the fastener 4 are flexible and resilient. Preferably, the fastener sections 8 and the fastener 4, as a whole, are ABS. However, a plastic or spring steel material can be used.

The shape and flexibility of the fastener sections 8 cooperatively permit the flexing of the longitudinal edges 14 to increase the distance therebetween, i.e., to increase the transverse gap 18. This flexion permits the panel 10 to be detachably secured to the rod-shaped structure 12.

That is, by urging the rod-shaped structure 12 against the longitudinal edges 14 of the fastening sections 8, the gap 18 will increase and the rod-shaped structure 12 will "snap" into the fastening sections 8. Once inserted, the longitudinal edges 14 return to a substantially relaxed state, thereby retaining the rod-shaped structure 12 within the fastening sections 8. Urging of the rod-shaped structure 12, or the fastener 4, in the opposite direction will cause the rod-shaped structure 12 to disengage the inner periphery 16 of the fastening sections 8.

As shown schematically in FIG. 3, the hingedly secured fastener 4 can be converted into a rigid fastener by means of a pin 20, or series thereof. The pin 20 is inserted through a first opening 21 in the fastening section 8 and a second opening 23 in the tubular structure 12. The pin 20 is then "pinched " to enlarge its inner end, thereby securing the fastener 4 and structure 12 together. Alternatively, the inner periphery 16 of the fastener 4 is coated with an adhesive which, when dried, bonds the fastening section 8 to the structure 12.

The fasteners 4, shown in FIGS. 1 and 2, cooperate to secure a pair of panels 10 to a single rod-shaped structure 12. As best shown in FIG. 2, the arrangement of the fastening sections 8 along strip section 6 defines a series of spacings 22 between the fastening sections 8. The fastening sections 8 and spacings 22 are similarly shaped such that the spacings 22 of each fastener 4 adaptively receive the fastening sections 8 of the other fastener 4.

Figure 4:
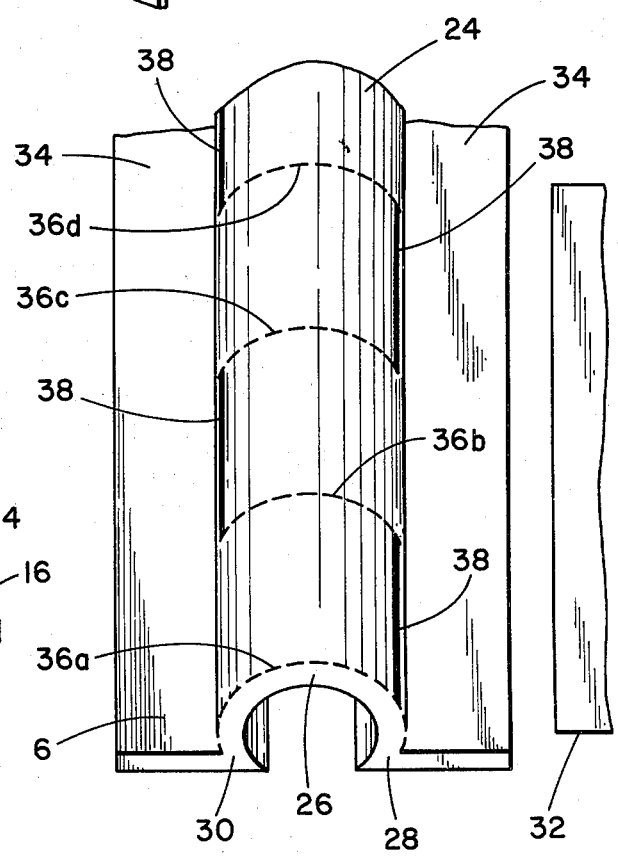
FIG. 4 is a perspective view of an extruded plastic part for manufacturing the preferred embodiment shown in FIG. 1.

Referring to FIG. 4, the fastening device 2 is fabricated from an extruded plastic piece 24. The plastic piece 24 includes a central, C-shaped portion 26. The strip sections 6 unitarily join the C-shaped portion 26 along junction lines 28, 30, respectively and extend outwardly therefrom. As shown, the strip sections 6 are substantially planar. The junction lines 28, 30 substantially lie in a plane 32 defined by the upper surface 34 of the strip sections 6.

To produce the cooperating fasteners 4, the central, C-shaped portion 26 is transversely cut at equal intervals. The transverse cuts are shown in FIG. 6 as dotted lines 36a, 36b, 36c and 36d. The plastic piece 24 in then alternately cut, between the transverse cuts 36, along the junction lines 28, 30. That is, between transverse cuts 36a, 36b, the plastic piece 24 is longitudinally cut along the junction line 28, and between the transverse cuts 36b, 36c, the longitudingal cut is made along the junction line 30. The longitudinal cuts are shown in FIG. 6 as heavy lines 38.

A single preferred embodiment of the present invention has been shown and described. It is to be understood, however, that various changes and modifications may be made without departing from the true scope and spirit of the present invention, as defined by the following claims. For example, in the cooperating fasteners 4 described above, the fastening sections 8 and spacings 22 need not be similarly shaped. The only requirements are that (1) the fastening sections 8 of each fastener 4 substantially align with the spacings 22 of the other fastener 4 and (2) the spacings 22 are of sufficient size to receive the fastening sections 8.

What I claim is:

1. A fastener for hingedly and detachably securing a panel to a rod-shaped structure having a substantially round cross-sectional periphery comprising:
   a strip section secured to said panel; and
   a series of flexible, resilient fastening sections having a partially circular cross-section shape, said fastening sections being spaced along said strip member, said circularity extending more than 180°, said partially circular section defining a first arc-ending longitudinal edge unitarily joining said section, a second free longitudinal edge, and a substantially round inner periphery substantially corresponding to said cross-sectional periphery of said rod-shaped structure, said fastening sections being adapted to engagingly receive said rod-shaped structure, said fastening sections, strip section, and rod-shaped structure cooperating to define hinge means for rotating said panel, said first and second longitudinal edges defining a transverse gap therebetween, said shape and flexibility of said fastening sections cooperating to define means for flexing said free longitudinal edge away from said strip section to increase the distance across said transverse gap, whereby said fastener is secured to and detached from said rod-shaped structure by urging said longitudinal edges in opposite directions against said rod-shaped structure.

2. A fastener as claimed in claim 1 wherein said flexible, resilient fastening members are plastic.

3. A fastener as claimed in claim 1 wherein said flexible, resilient fastening members are equally spaced along said strip member.

4. A fastening device for hingedly and detachably securing a first and second panel to a rod-shaped structure having a substantially round cross-sectional periphery comprising a pair of fasteners, said fastener having a strip section secured to one of said panels and a series of flexible, resilient fastening sections having a partially circular cross-sectional shape, said fastening sections being spaced along said strip member to define a series of spacings between said fastening sections, said fastening sections and said spacings of one of said fasteners being adapted to cooperatively receive said fastening sections and said spacings of said other fastener, said circularity extending more than 180°, said partially circular section defining a first arc-ending longitudinal edge unitarily joining said strip section, a second free longitudinal edge, and a substantially round inner periphery substantially corresponding to said cross-sectional periphery of said rod-shaped structure, said fastening sections being adapted to engagingly receive said rod-shaped structure, said first and second longitudinal edges defining a transverse gap therebetween, said shape and flexibility of said fastening sections cooperating to define means for flexing said second free longitudinal edge away from said first arc-ending longitudinal edge to increase the distance across said transverse gap, whereby said fastener is secured to and detached from said rod-shaped structure by urging said longitudinal edges to opposite directions against said rod-shaped structure.

* * * * *